United States Patent [19]
Sakai

[11] 4,144,421
[45] Mar. 13, 1979

[54] HYDRAULIC MACHINE SHUTDOWN SENSOR ASSEMBLY

[75] Inventor: Takao Sakai, Katsuta, Japan

[73] Assignee: Hitachi, Ltd., Japan

[21] Appl. No.: 751,715

[22] Filed: Dec. 17, 1976

[30] Foreign Application Priority Data

Dec. 19, 1975 [JP] Japan .................. 50-150523

[51] Int. Cl.² ............... H01H 3/16; F01D 21/00
[52] U.S. Cl. .................. 200/61.4; 415/14; 415/118
[58] Field of Search ............. 415/9, 10, 13, 14, 118; 200/61.4, 61.41

[56] References Cited

U.S. PATENT DOCUMENTS

| | | | |
|---|---|---|---|
| 2,209,466 | 7/1940 | Miller | 415/118 X |
| 2,992,618 | 7/1961 | Means | 415/13 |
| 3,186,684 | 6/1965 | Takase | 415/118 |
| 3,388,889 | 6/1968 | Willi | 415/118 X |
| 3,403,889 | 10/1968 | Ciokajlo | 415/118 X |
| 3,612,710 | 10/1971 | Mount | 415/14 |
| 3,989,408 | 11/1976 | Jaegtnes | 415/14 |

Primary Examiner—James R. Scott
Attorney, Agent, or Firm—Craig & Antonelli

[57] ABSTRACT

A system for shutting down a hydraulic machine having a runner mounted on a rotating shaft and a stationary part or parts surrounding the runner, comprising a rod or rods installed on the stationary part or parts opposite to the periphery of the runner, each rod being yieldable to the pressure of the runner, in case of the latter's deformation or off-center displacement, so as to sense the gap between the runner and the stationary part, a member or members each adapted to be actuated when the stroke of the associated sensing rod has exceeded a predetermined value, and a shutdown device operable upon actuation of the said member.

6 Claims, 5 Drawing Figures

HYDRAULIC MACHINE SHUTDOWN SENSOR ASSEMBLY

BACKGROUND OF THE INVENTION

This invention relates to a system for shutting down a hydraulic machine, such as a pump, turbine, or pump-turbine, when the gap or gaps between the runner of the machine and stationary part or parts surrounding the runner have narrowed unusually due to deformation, off-center displacement, or any other irregularity on the part of the runner or the like.

The lessening of the gaps occurs, for example, because of the following reason.

With a reversible pump-turbine, switching from the generating to pumping operation requires a high starting torque at no load. It is therefore customary to introduce compressed air into the runner chamber to lower the water level below the bottom of the runner so that the runner can run idle and, after a predetermined runner speed has been reached, allow the water to come up to the level high enough for pumping. If water accidentally enters the runner chamber while the runner is idling, it will find no way out and cause no-discharge operation. When this happens, a water curtain is formed along the stationary parts around the runner, and the runner must run with its blade tips forcing away the water curtain from their path, or with the so-called water-curtain brake applied. This will rapdily lead to temperature increases of the runner and runner chamber and thermal expansion of the runner, with unusual reduction of the gaps between the runner and the surrounding stationary parts.

In an effort to prevent the danger of the runners of hydraulic machines being broken through contact with stationary parts due to deformation or displacement of the runners, a shutdown system using mercury switches has already been proposed. Accordng to Japanese Utility Model Publication No. 31705/61, the proposed system arranges a mercury switch or switches, each comprising two electrodes and a large globule of mercury bridging the electrodes for electric continuity and sealed altogether in a glass container, between the runner and the surrounding stationary parts, in such a manner that, if the runner is deformed of displaced to alter the gap between itself and a given stationary part, it will come into contact with the associated mercury switch and destroy the same. The system detects the malfunction of the runner from the cutoff of the electric circuit including the broken mercury switch, and brings the hydraulic machine to a stop.

With the system above described, the replacement of the broken mercury switch following the operation of the system is not easy, because the switch is usually installed at a point normally submerged. Moreover, such switches using poisonous mercury can pose a pollution problem. A further disadvantage is the extreme difficulty in adjusting the gaps between the runner and the stationary parts since the adjustment work tends to damage the system or mercury switches themselves.

SUMMARY OF THE INVENTION

The object of this invention is to overcome the difficulties of the aforedescribed system and provide a system for shutting down a hydraulic machine which will not suffer any damage from its functioning and permit the gaps to be adjusted with ease.

According to the invention, a system is provided which shuts down a hydraulic machine having a runner mounted on a rotating shaft and a stationary part or parts surrounding the runner, comprising a rod or rods installed on the stationary part or parts opposite to the periphery of the runner, each of the rods being yieldable to the pressure of the runner, in case of any deformation or off-center displacement of the runner, so as to sense the gap between the runner and the associated stationary part, a member or members each of which is actuated when the stroke of the associated sensing rod has exceeded a predetermined value, and a shutdown device operable upon actuation of the member or members.

DESCRIPTION OF PREFERRED EMBODIMENTS

Figure 1:
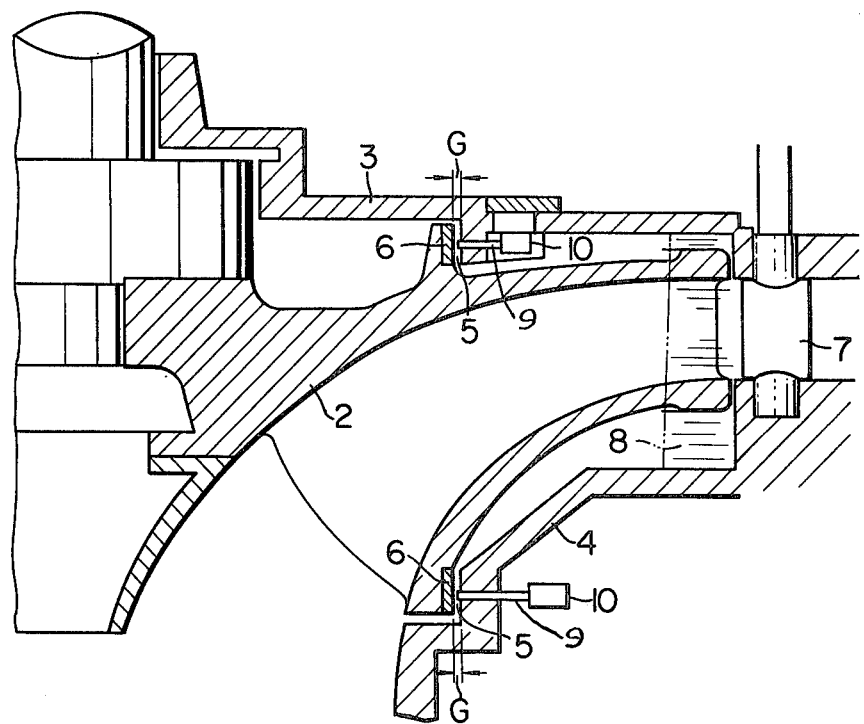
FIG. 1 is a schematic sectional view of an embodiment of the invention.

Referring to FIG. 1, there are shown a main shaft 1, a runner 2 mounted on the shaft, a head cover 3, and a discharge ring 4. Between the runner 2 and both head cover 3 and discharge ring 4 are provided sealing zones 5 which form gaps G. A rotating wearing ring 6 is bolted, welded, or otherwise attached to the portion of the runner 2 in the sealing zones. The exposed outer periphery of the ring 6 is opposed to the inner surfaces of the head cover and discharge ring through the gaps. The numeral 7 designates wicket gates.

When it happens that the runner 2 is deformed or the runner 2 and the head cover 3 and/or the discharge ring 4 are offset from each other for some reason, the gap or gaps G will no longer maintain their original settings but will narrow accordingly.

For example, if the arrangement shown is of a reversible pump-turbine and is started by forcing the water level below the bottom of the runner by means of compressed air, enabling the runner to run idle, then any amount of water unintentionally admitted to the runner chamber will find no way out. This will lead to no-discharge operation and cause the runner blades to run while forcing away a water curtain 8 from their path or, so to speak, with a water-curtain brake applied. Consequently, the runner and runner chamber temperatures will rise and the runner 2 will expand to lessen the gaps G.

It will be appreciated that, where the rotating wearing ring 6 is bolted in place, the difference in material and therefore in thermal expansion coefficient between the wearing ring and the runner and bolts thereon may result in breakage of the bolts and falling off of the ring from the runner. When the rotating wearing ring is of welded construction and shrinkage fitted to the runner, the difference in material and expansion may again break the weld, causing the ring to come off from the runner. This can bring the danger of the runner directly contacting the stationary parts during operation.

Figure 3:
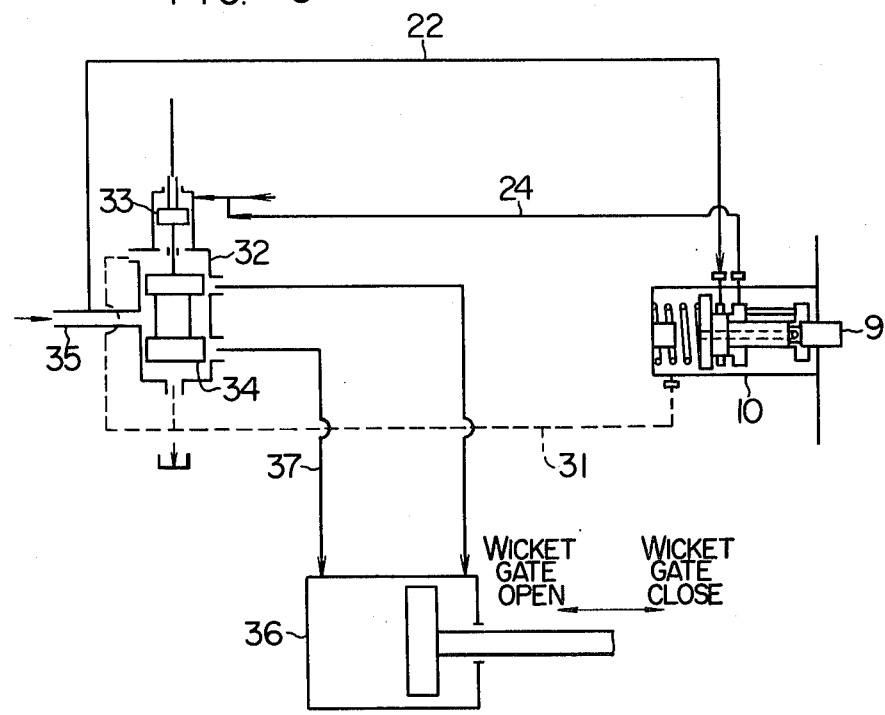
FIG. 3 is an oil hydraulic circuit diagram for the embodiment.

In the embodiment being described, the sealing zones of the head cover 3 and discharge ring 4 are each provided with one to several gap-sensing rods 9 and associated selector 10 or selectors for cooperatively controlling the operation of a shutdown device 36 (FIG. 3).

Figure 2:
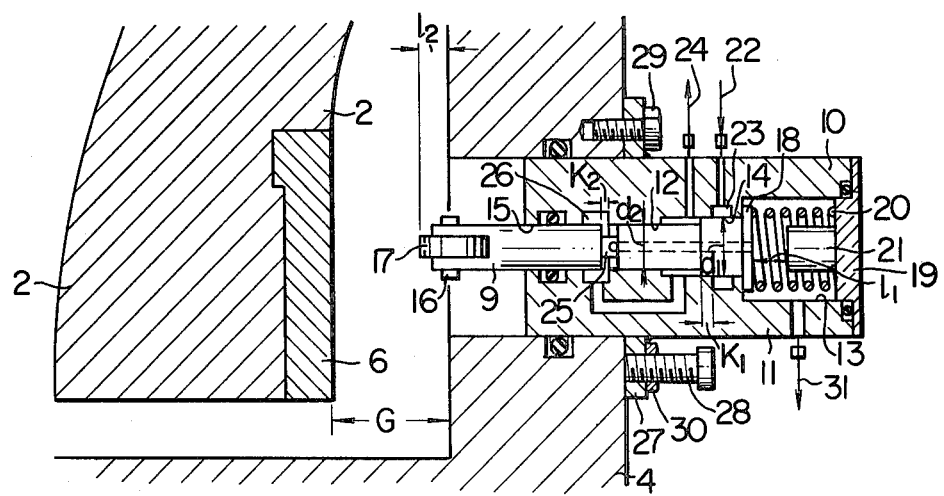
FIG. 2 is a detail of the essential part of FIG. 1.

FIG. 2 is a detail showing such a gap-sensing rod 9 and a selector 10. The body 11 of the selector has a bore 12 consisting of a large-diameter section 13, medium-diameter section 14, and a small-diameter section 15. The gap-sensing rod 9, inserted in the bore 12, includes a portion with a diameter $d_1$ slidably engaged with the medium-diameter section 14 of the bore, and a portion with a smaller diameter $d_2$ slidable with respect to the small-diameter section 15. The small-diameter portion of the rod is bifurcated at the free end which, with a pin 16, carries a roller 17 rotatably between the two arms. The roller 17 projects beyond the inner surface of the discharge ring 4 by a distance $l_2$. On the opposite end of the gap-sensing rod is formed a flange 18, which supports between its outer side and the inner side of a closure 19 on the open end of the large-diameter section 13 a spring 20 for biasing the gap-sensing rod 9 leftward to the position shown. A stopper 21 limits the (rightward) axial travel of the rod within a distance $l_1$. A pressure fluid feed line 22 is connected to an annular recess 23 formed around the medium-diameter section 14 of the bore. A pressure fluid discharge line 24 is communicated at one end to the medium-diameter section 14 and at the other end to a system for operating the shut-down device for the turbine (FIG. 3). The gap-sensing rod 9 further includes a constricted part 25 formed in the section with the diameter $d_2$, and the space around the constricted part is communicated with the large-diameter section 13 of the bore 12 via a passage formed through the gap-sensing rod. Facing this constricted part, an annular recess 26 is formed around the small-diameter section 15 of the bore and is communicated with the medium-diameter section 14 through a passage formed in the selector body. The body has a mounting flange 27, which in turn has a plurality of internally threaded holes for receiving gap-adjusting bolts 28 and a plurality of holes for receiving mounting bolts 29, those holes being alternately formed on the periphery of the flange 27. In FIG. 2 the numeral 30 indicates one of lock nuts, and 31 a drain pipe.

In FIG. 3, 32 is a distributing valve, 33 a piston, 34 a main valve, 35 a pressure fluid feed line, 36 a shutdown device such as wicket gate servomotor, and 37 a shutdown system line.

It will be understood from the foregoing description that the selector 10 in this embodiment is essentially a directional control valve for fluid under pressure.

Assuming now that the runner has been deformed or displaced to narrow a gap G, the runner will come into contact with the roller 17 on the gap-sensing rod 9. With further reduction of the gap G, the gap-sensing rod will be pushed rightward as viewed in FIG. 2. As the rod thus recedes past laps $K_1$, $K_2$ of the selector, the pressure fluid that has been introduced through the feed line 22 and trapped in the annular recess 23 will be admitted to the discharge line 24 by the switching of the flow direction which will then enable the fluid to flow between the medium-diameter section 14 of the bore and the portion of the sensing rod with the diameter $d_2$ into the discharge line. As in FIG. 3 the fluid acts on the upper surface of the piston 33 of the distributing valve 32 to force the piston downward together with the main valve 34 connected to the piston. This permits pressure fluid from the feed line 35 to flow through the shutdown system line 37 into the shutdown device, thus actuating the device to close the wicket gates and bring the turbine to a stop.

In practice of the invention, the stroke setting of the gap-sensing rod is such that $l_1 > l_2$, with laps $K_1 \geqq K_2$ and with rod diameters $d_1 > d_2$. With these settings a stroke $l_1 - K_1$ is obtained automatically when the sensing rod has been forced back past the lap $K_1$ with the roller 17 in contact with the runner, because the pressure fluid then acts on the differential cross sectional area between the portions $d_1 > d_2$. As long as the pressure fluid acts in this way, the gap-sensing rod is kept in the receding position and protected against any impact of contact with the runner.

The mounting position of the sensing rod 9 is adjusted by first loosening the mounting bolts 29 and the lock nuts 30, turning the gap-adjusting bolts 28 clockwise or counterclockwise to a suitable gap setting, retightening the lock nuts 30, and finally retightening the mounting bolts. In the manner described the gap between the runner 2 and the sensing rod can be adjusted to a desired value.

Figure 4:
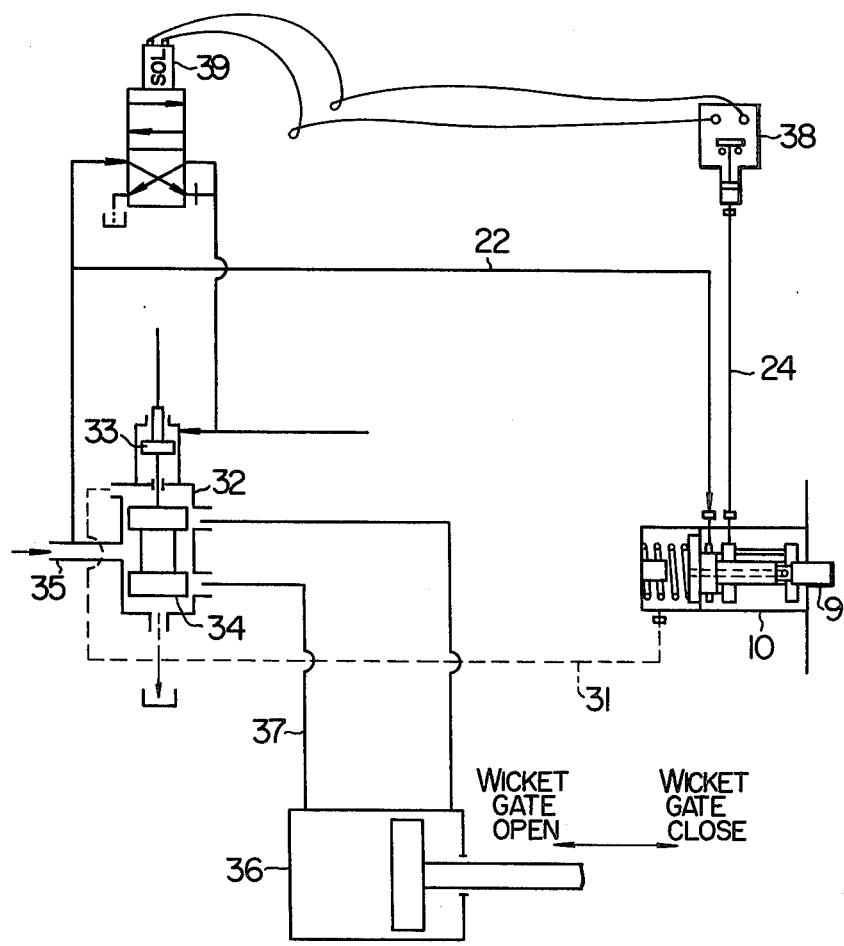
FIG. 4 is an oil hydraulic circuit diagram modified with incorporation of electric elements.

FIG. 4 shows the same oil hydraulic circuit arrangement as in FIG. 3 with the exception that the pressure fluid discharge line 24 is not directly connected to the distributing valve 32 as in FIG. 3 but is connected to a pressure switch 38 which, in turn, is electrically connected to a solenoid valve 39. The solenoid valve is installed on a line branched from the pressure fluid feed line 35 and which opens above the piston 33 of the distributing valve 32. Thus, as the gap-sensing rod recedes upon contact with the runner, communication is established between the pressure fluid feed line 22 and discharge line 24 to actuate and close the pressure switch 38 and thereby energize the solenoid valve 39. The valve then introduces the pressure fluid from the feed line 35 into the distributing valve 32 to urge the piston 33 downward. In this manner the wicket gates are closed to stop the turbine in the same way as has been described in connection with FIG. 3.

While the selector in the embodiments so far described is built as a directional control valve for pressure fluid, it is, of course, possible to replace the mechanism by one for switching an electric circuit over to another circuit and vice versa.

Figure 5:
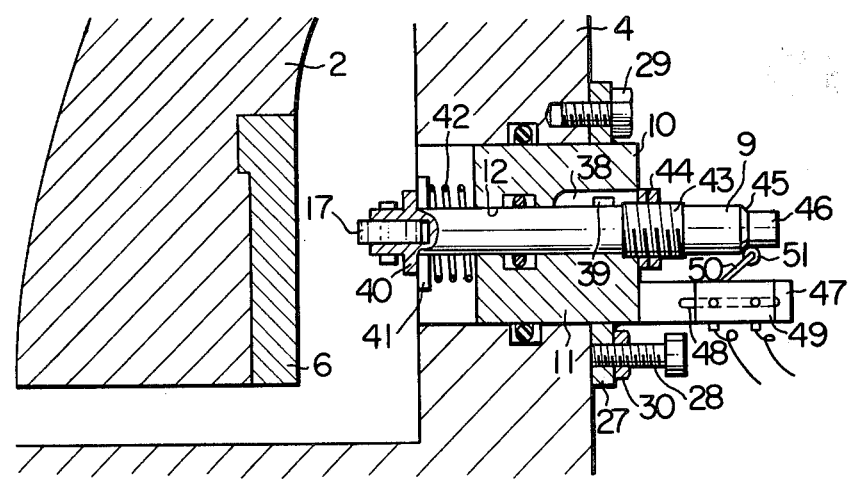
FIG. 5 is a view similar to FIG. 2 showing another embodiment of the invention.

FIG. 5 shows a modification, in which the bore 12 of the body 11 of the selector 10 is formed with a key way 38 adapted to engage a key 39 formed on the gap-sensing rod 9, so that the rod is kept axially slidable and unrotatable. On the inner end of the gap-sensing rod is formed a flange 40, which holds a washer 41 and also a spring 42 between the washer and the inner end surface of the selector body. The gap-sensing rod has an externally threaded portion 43, and two lock nuts 44 are threadably engaged with this portion and bear against the outer end surface of the selector body 11 under the action of the spring 42 to keep the gap-sensing rod 9 in the position shown. The sensing rod has a shoulder 45 near its outer end which forms a small diameter portion 46. The shoulder 45 serves as a cam as will be described later. To the outer end of the selector body is attached a bracket 47 having a slot 48 with which a switch 49 is adjustably supported, with a roller 51 on a switch arm 50 extended from the switch body in sliding contact with the shoulder 45 or small-diameter portion 46. The switch is electrically connected to an electric device, for example, the solenoid valve 39 in FIG. 4, in the operating system for the shutdown device.

If for some reason the runner deviates from its normal path and pushes the roller 17 of the gap-sensing rod 9, the shoulder 45 of the receding rod will by its cam action urge the switch arm 50 downward to have the switch 49 turned on. Then, the solenoid valve 39 is energized, the wicket gates are closed, and the turbine is brought to a stop in the manner already stated.

As will be clear from the above description, the system according to the invention is easy to maintain because the gap-sensing rod simply recedes and has no possibility of breakage upon contact with the runner, regardless of the number of times the shutdown device is thereby operated. Manual adjustment of the gaps between the runner and the stationary parts such as the head cover will cause no damage whatsoever. Moreover, the gap between the runner and each gap-sensing rod can be adjusted with ease. The system according to this invention can, therefore, be advantageously used with hydraulic machines to prevent accidents due to deformation or off-center displacement of their runners.

What is claimed is:

1. A system for shutting down a hydraulic machine having a runner mounted on a rotating shaft, at least one stationary part surrounding the runner, and a sensor assembly, comprising:
    at least one sensing rod of said sensor assembly slidably supported in the direction of its longitudinal axis in said stationary part opposite to the periphery of said runner, said sensing rod being biased toward the runner by resilient means and being slidably movable under pressure of said runner, in case of any deformation or off-center displacement of said runner, so as to sense the gap between said runner and the associated stationary part,
    at least one member of said sensor assembly mounted in said stationary part opposite to the periphery of said runner and forming part of a fluid pressure circuitry which member is actuated when the stroke of the associated sensing rod has exceeded a predetermined value, and
    a shutdown device operable through said fluid pressure circuitry upon actuation of said member.

2. A system according to claim 1, which further comprises means for making said sensing rod recede to a given backward position automatically when the stroke of said sensing rod has exceeded a predetermined value, and said means simultaneously holding said sensing rod in said backward position.

3. A system according to claim 1, which further comprises means for adjusting the gap between said runner and said sensing rod.

4. A system according to claim 1, wherein said member, which is actuated when the stroke of the associated sensing rod has exceeded a predetermined value, also forms a part of an electric circuitry.

5. A system according to claim 1, wherein said member is a directional control valve for fluid under pressure in said fluid pressure circuitry.

6. A system according to claim 1, wherein said member is a means for switching an electric circuit over to another circuit and vice versa.

* * * * *